(12) United States Patent
Fischer et al.

(10) Patent No.: US 10,719,678 B2
(45) Date of Patent: Jul. 21, 2020

(54) DEVICE FOR CHECKING ACCESS AUTHORIZATIONS STORED ON DATA CARRIERS

(71) Applicant: Axess AG, Anif (AT)

(72) Inventors: Josef Fischer, Hallein (AT); Christian Windhager, Elsbethen (AT); Oliver Suter, Bad Durrnberg (AT)

(73) Assignee: Axess AG, Anif (AT)

( * ) Notice: Subject to any disclaimer, the term of this patent is extended or adjusted under 35 U.S.C. 154(b) by 0 days.

(21) Appl. No.: 16/338,648

(22) PCT Filed: Sep. 22, 2017

(86) PCT No.: PCT/EP2017/074026
§ 371 (c)(1),
(2) Date: Apr. 1, 2019

(87) PCT Pub. No.: WO2018/065238
PCT Pub. Date: Apr. 12, 2018

(65) Prior Publication Data
US 2019/0340402 A1    Nov. 7, 2019

(30) Foreign Application Priority Data

Oct. 6, 2016   (AT) .................................. A 463/2016

(51) Int. Cl.
*G06K 7/10*      (2006.01)
*E06B 11/08*     (2006.01)
(Continued)

(52) U.S. Cl.
CPC .......... *G06K 7/10861* (2013.01); *E06B 11/08* (2013.01); *G06K 7/1098* (2013.01); *G07C 9/00944* (2013.01); *G07C 9/20* (2020.01)

(58) Field of Classification Search
CPC ..................................... G06K 7/10; G05B 1/03
(Continued)

(56) References Cited

U.S. PATENT DOCUMENTS 4,766,297 A *  8/1988  McMillan .......... G06K 7/10861
                                                        235/455
4,988,851 A *  1/1991  Kohno .................... A47F 9/046
                                                        186/61

(Continued)

FOREIGN PATENT DOCUMENTS

AT           400775 B       3/1996
AT           004500 U1      7/2001
(Continued)

OTHER PUBLICATIONS

International Search Report and Written Opinion, PCT/EP2017/074026; dated Dec. 18, 2017; 7 pages.
(Continued)

*Primary Examiner* — Nam V Nguyen
(74) *Attorney, Agent, or Firm* — Liang & Hennessey; Brian E. Hennessey

(57) ABSTRACT

A device for checking access authorizations stored on data carriers is provided, having a reading unit, arranged in the access region, for the data carrier, said reading unit actuating a signaling means and/or a blocking means, wherein the reading unit includes a housing having an insertion region for the data carrier and the insertion region having an upper first wall with a reading module sensing the insertion region, a lower second wall of the insertion region be fastened detachably and/or pivotably to the housing, that the reading unit can be changed from a first state to a second state in a predefinable manner by pivoting and/or removing the lower second wall, wherein in the first state of the reading unit, the second wall, together with the first wall, forms a U- or
(Continued)

V-shaped insertion region and in the second state, the insertion region is L-shaped and open towards the bottom.

6 Claims, 2 Drawing Sheets

(51) Int. Cl.
*G07C 9/00* (2020.01)
*G07C 9/20* (2020.01)

(58) Field of Classification Search
USPC ....... 340/5.83, 5.2; 235/462.14, 462.43, 382, 235/384, 470
See application file for complete search history.

(56) References Cited

U.S. PATENT DOCUMENTS

| | | | |
|---|---|---|---|
| 5,140,141 A | 8/1992 | Inagaki et al. | |
| 5,177,345 A * | 1/1993 | Baitz | A47F 9/046 186/61 |
| 5,202,550 A * | 4/1993 | Kocznar | G06K 7/0008 235/375 |
| 5,291,007 A * | 3/1994 | Sakai | G06K 7/10663 235/462.34 |
| 5,308,963 A * | 5/1994 | Baitz | A47F 9/046 186/62 |
| 5,376,921 A * | 12/1994 | Trikilis | G07C 9/02 335/284 |
| 5,478,998 A * | 12/1995 | Charych | G06K 7/10861 235/462.43 |
| 6,047,889 A * | 4/2000 | Williams | B07C 3/14 235/383 |
| 6,310,581 B1 * | 10/2001 | Stockhammer | G07C 9/02 235/382 |
| 6,634,557 B2 * | 10/2003 | Kocznar | G06K 7/10693 235/380 |
| 6,811,086 B1 * | 11/2004 | Kumagai | G06K 7/10594 235/462.14 |
| 7,360,695 B2 * | 4/2008 | Ponert | G07C 9/00111 235/382 |
| 7,370,802 B2 * | 5/2008 | Wood | G06K 7/10881 235/462.43 |
| 7,513,423 B2 * | 4/2009 | Kocznar | G07C 9/00944 235/382 |
| 2014/0266604 A1 * | 9/2014 | Masood | G06K 9/00221 340/5.83 |

FOREIGN PATENT DOCUMENTS

| | | |
|---|---|---|
| DE | 20114630 U1 | 11/2001 |
| EP | 0905641 B1 | 3/1999 |
| EP | 1605413 B1 | 12/2005 |
| EP | 2234032 A2 | 9/2010 |

OTHER PUBLICATIONS

Austrian Search Report, Austrian Patent Application No. A 463/2016; dated Jan. 17, 2018; 1 page.

* cited by examiner

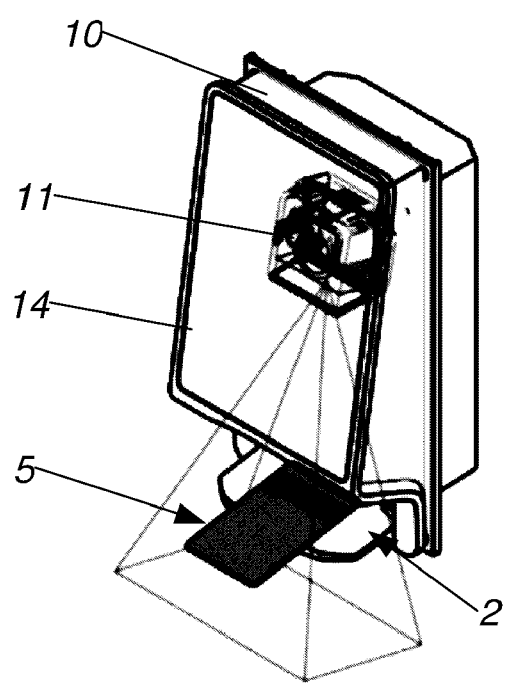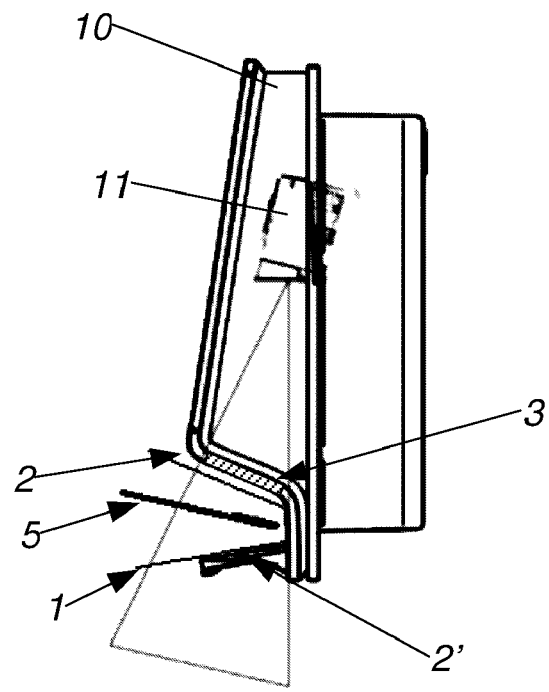
Fig. 1    Fig. 2
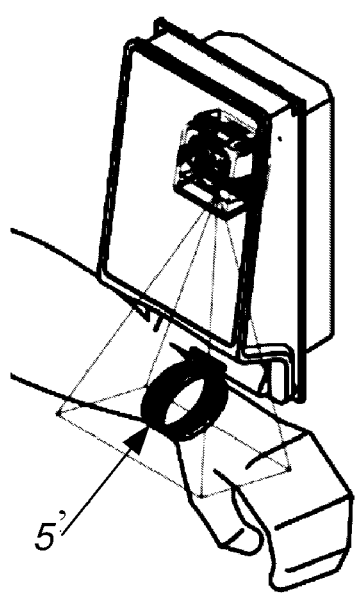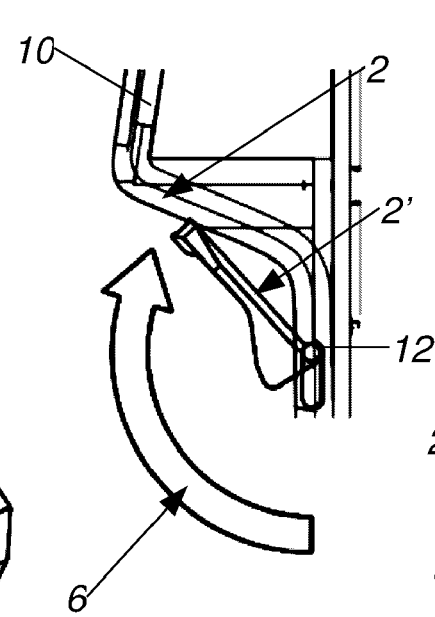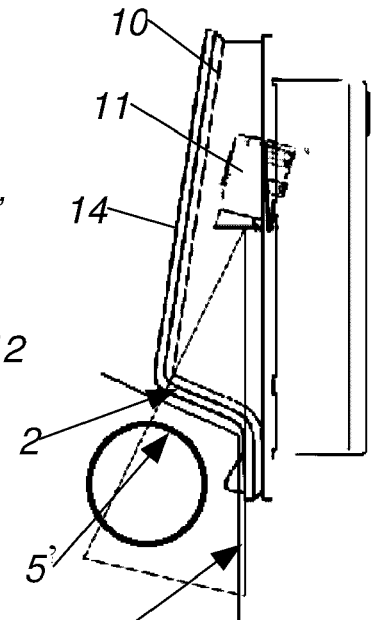
Fig. 3    Fig. 4    Fig. 5

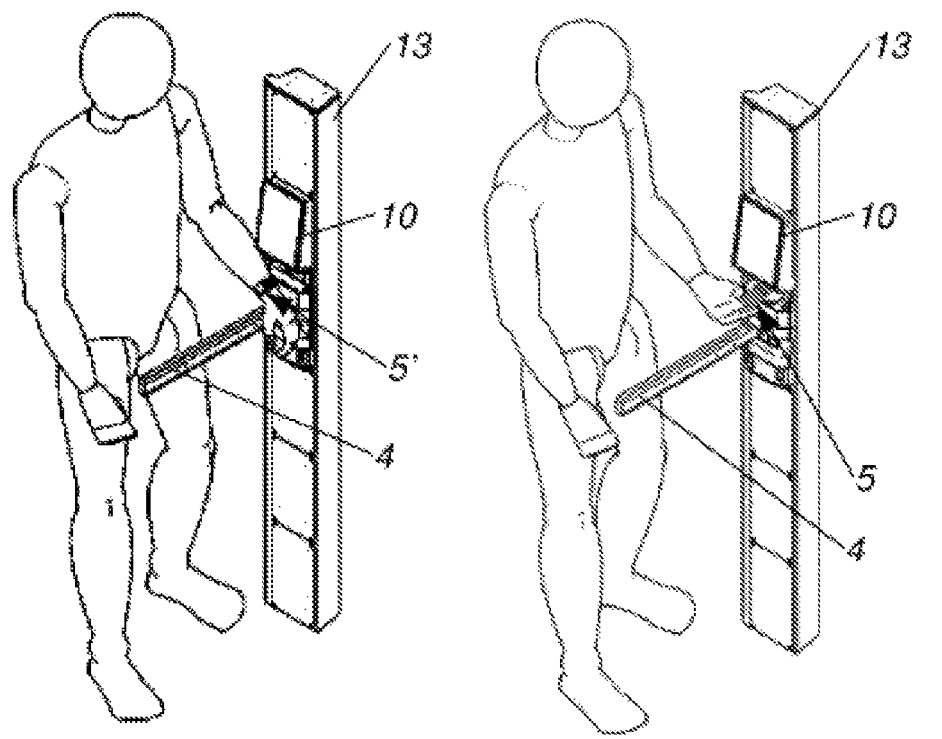
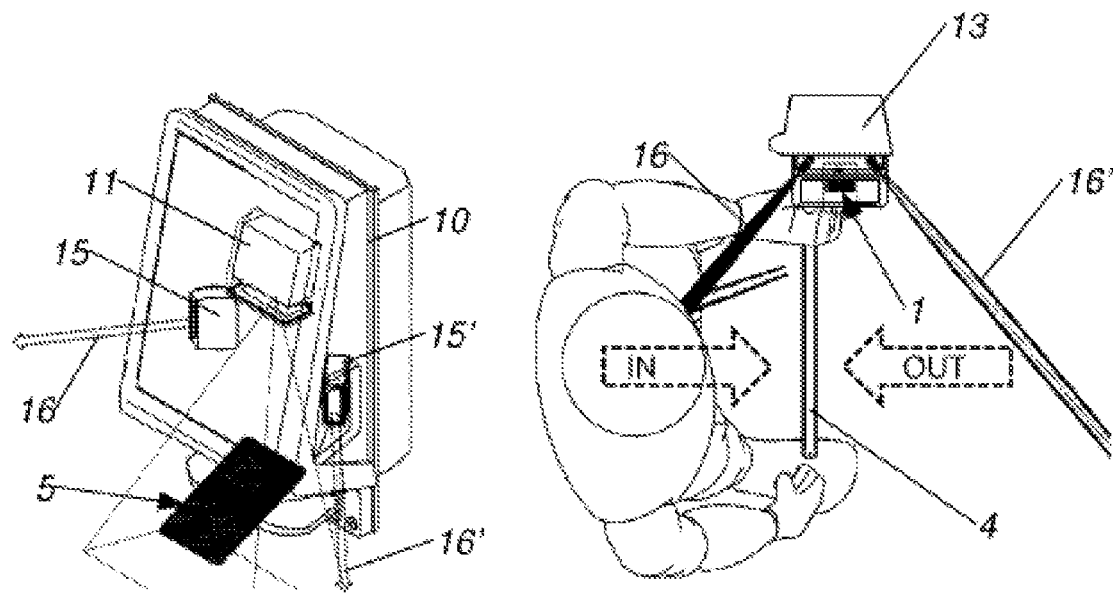

DEVICE FOR CHECKING ACCESS AUTHORIZATIONS STORED ON DATA CARRIERS

CROSS-REFERENCE TO RELATED APPLICATIONS

This application is a national phase application of PCT Application No. PCT/EP2017/074026, filed Sep. 22, 2017, entitled "DEVICE FOR CHECKING ACCESS AUTHORIZATIONS STORED ON DATA CARRIERS", which claims the benefit of Austrian Patent Application No. A 463/2016, filed Oct. 6, 2016, each of which is incorporated by reference in its entirety.

FIELD OF THE INVENTION

The invention relates to a device for checking access authorizations stored on data carriers, with a reading unit, arranged in the access region, for the data carrier, which reading unit actuates a signaling means and/or a blocking means, wherein the reading unit features a housing with an insertion region for the data carrier, and the insertion region features an upper first wall with a reading module sensing the insertion region.

BACKGROUND

Ticket readers are known with an insertion slot in the respective format of the data carrier, for instance in credit card format in automatic teller machines. The disadvantage here is that the user may often not detect the insertion slot, and that therefore processing time is high. For a cash dispensing machine this may still be acceptable, but for access control this leads to congestion at the access point.

An improved device was described, for instance, in DE20114630, wherein it is proposed that the insertion region be designed significantly larger than the ticket used. The V-shaped insertion region has a window in its upper wall, through which a bar code scanner scans the insertion region. This embodiment has the advantage that a large-sized shaft will continue to be recognized by the user as an insertion region for tickets, without a limitation being imposed on the ticket format.

Tickets as data carriers for access control are known in many embodiments. In particular for automated access control, the credit card format has prevailed. This format is familiar to most users and can be used for a variety of ticket technologies. Examples are tickets with bar code, with magnetic strips, or with laminated RFID chips. A fundamental disadvantage of such data carriers is that it can easily be transferred to third parties.

SUMMARY

The task of the invention is to improve a device for access control such that operation is facilitated, processing time is consequently shorter, and the device is suitable for card-shaped data carriers as well as for personalized data carriers.

Departing from the aforementioned type category, in which the reading unit features a housing with an insertion region for the data carriers, and the insertion region features an upper first wall with a reading module sensing the insertion region, according to the invention, this is accomplished in that a lower second wall of the insertion region is detachably and/or pivotably attached to the housing, in that the reading unit can be changed in a predefinable manner from a first state to a second state by pivoting and/or removing the lower second wall, wherein in the first state of the reading unit, the second wall, together with the first wall, forms a U- or V-shaped insertion region, whereas in the second state, the insertion region is L-shaped and open towards the bottom.

A material advantage of this embodiment is that the reading unit with the U- or V-shaped insertion region is well-suited to reading data carriers in credit card format, whereas the pivoting away of the lower wall of the insertion region creates an L-shaped insertion region that is open towards the bottom. In this position, the reading unit is optimally adapted to read data carriers in the form of wrist bands.

Thus, for instance, the reading unit according to the invention may be used for reading tickets in card format by way of standard operation, whereas for events it can be used to read tickets in the form of wrist bands. A wrist band is particularly well suited to be durably attached to its owner, thus preventing an impermissible transfer of the ticket to third parties. A wrist band is also more advantageous, for instance, for operating a swimming event.

If a proximity sensor is arranged in the housing of the reading unit, a further improvement in the flow of people can be achieved. Viewed in the direction of access, the scanning range of the proximity sensor should be oriented before or after the insertion region for the data carriers. Thus, approval will ensure that the person requesting access is in the right position.

Alternatively, two proximity sensor may be arranged in the housing of the reading unit, such that seen in the direction of access, the scanning range of the first proximity sensor would be oriented before the insertion region for the data carriers, whereas the scanning range of the second proximity sensor would be oriented behind the insertion region for the data carriers. Access is then possible in both directions.

BRIEF DESCRIPTION OF THE DRAWINGS

The invention will now be further explained based on an exemplary embodiment, with reference to the drawings.

FIG. 1 shows an oblique view of the reading unit,

FIG. 2 shows a schematic cross section of this reading unit,

FIG. 3 shows an oblique view of the reading unit configured for use with wrist bands as data carriers, FIG. 4 shows a schematic section of the reading unit with a pivotable lower wall of the insertion region, FIG. 5 shows the schematic cross section of the reading unit configured for use with wrist bands as data carriers, FIG. 6 shows the oblique view of an access point with a reading unit according to the invention configured for use with wrist bands, FIG. 7 shows the oblique view of an access point with a reading unit according to the invention configured for use with data carriers in card format, FIG. 8 shows the schematic oblique view of the reading unit with an additional proximity sensor, and FIG. 9 shows the top view of an access point equipped with this reading unit.

DETAILED DESCRIPTION

As shown in FIGS. 1 and 2, the reading unit according to the invention consists of a housing 10 which, as will be explained below, can be built into an access control barrier such as a turnstile, or simply be arranged with signaling devices in the access region. A reading module is arranged in the upper part of the housing 10. Below the reading module, a U-shaped insertion region 1 for data carriers 5, 5' is formed by an upper first wall 2 and a lower wall 2'.

In particular, it may be provided that the reading module has a window 3 with a bar code scanner 11 behind it arranged in the upper first wall 2, such that the bar code scanner 11 scans the insertion region 1 through the window 3. The upper wall 2 comprises a window 3, showed as shaded in FIG. 2, through which the bar code scanner 11 scans the insertion region.

Multiple suitable bar code scanners are known, for instance the "Zebra DS457 Imager", and they typically use camera systems with downstream evaluation logic, which scan a bar code and transmit its numerical content to an access system downstream. It should be pointed out explicitly, however, that in the framework of invention, this bar code scanner 11 can obviously be exchanged for any other suitable scanning technology, including, for instance, by an RFID reader. Accordingly, the term windows 3 must be understood abstractly; what is material is that the upper wall 2 of the insertion region 1 for the respectively selected scanning technology be transparent (for instance to infrared electromagnetic waves of the RFID reading module).

The configuration of the reading unit according to the invention shown in FIGS. 1 and 2 is optimally suited for card-shaped data carriers 5, since it can be easily presented for reading the authorization, and the user would intuitively understand that they are expected to insert the data carrier 5 into the insertion region 1. This configuration corresponds to the first state of the reading unit.

FIG. 4 shows that the lower wall 2' of the insertion region 1 is foldably attached to the housing 10 by means of a hinge 12. The arrow 6 marks the swinging movement of the lower wall 2', which is made possible by the hinge 12. If the lower wall 2' is now folded upward, the formerly U-shaped insertion region 1 is converted into an L-shaped insertion region 1 that is open towards the bottom. The reading unit according to the invention is now optimally configured to read data carriers 5' in the form of a wrist band, since the user can easily bring their arm into a position suitable for reading. FIGS. 3 and 5 show this position in an oblique view and in a schematic cross section. This configuration corresponds to the second state of the reading unit.

Therefore, a device for checking access authorizations stored on data carriers 5, 5' can be provided, having a reading unit, arranged in the access region, for the data carrier 5, 5', which actuates signaling means and/or blocking means 4. The reading unit features a housing 10 with a U- or V-shaped insertion region 1 for the data carriers 5, 5', and wherein the U- or V-shaped insertion region 1 is formed in part by an upper first wall 2, in which a window 3 is arranged with a bar code scanner 11 behind it, which scans the insertion region 1 through the window. The second, lower wall 2' of the U-shaped insertion region 1 is attached to the housing 10 by means of a detachable or swiveling hinge 12, such that the U- or V-shaped insertion region 1 can be converted into an L-shaped insertion region 1 that is open towards the bottom by pivoting or removing the lower wall.

It is also indicated here that above of the insertion region 1, a large-scale display 14 is arranged on the housing 10, such that usage instructions can be entered directly in the reading zone.

Wrist bands as data carriers 5' for access control are commonly known, and they typically use either bar codes imprinted on the wrist band or RFID Inlays. Wrist bands are particularly favored for one-time events, since the wrist band can be attached to its owner with a single-use seal, this preventing a transfer to unauthorized third parties. Another application is swimming pools, where the wrist band is well-suited to attach the data carrier to the authorized person without risk of loss.

FIG. 6 shows a schematic access control with a column 13 supporting an access blocking means 4. In this example, the blocking means 4, which may also be referred to as a blocking device or as an access barrier, is a flap arm that can be motorically moved from the Closed position to the Open position when the access system recognizes the authorization as valid.

The person approaching in FIG. 6 carries a data carrier 5' in the form of a wrist band, and the reading unit according to the invention is configured with an L-shaped insertion region through the folding up of the lower wall 2' of the insertion region, that is, in the second state. It is clearly visible here that the reading unit according to the invention allows for a readable delivery of the data carrier 5' in wrist band format.

FIG. 7 shows the same access control, wherein here the reading unit according to the invention is configured with the wall 2' folded down, that is, in the first state, in order to offer the user with a card-shaped data carrier 5 optimal ergonomics.

The invention therefore provides a reading unit that may be adjusted for any respective application. This is particularly advantageous when the requirements of the data carriers 5, 5' may change in the short term. For instance, access control to a holiday resort may be configured in winter with a U-shaped scanning region for cards, and in the summer with an L-shaped scanning region.

The reading unit shown in FIG. 8 features two proximity sensor 15 and 15' in addition to the bar code scanner 11. By way of a proximity sensor, for instance, a light scanner can be used, such as the Sick WL 11 photoelectric sensor. Such a light scanner sends out a light beam, which may be reflected by a person standing in the path of the beam, and which controls a switch output.

The scanning range 16 of the first proximity sensor 15 seen in the IN direction of access is oriented before the insertion region 1 for the data carriers 5, 5'. The scanning range 16' of the second proximity sensor 15' seen in the IN direction of access is oriented behind the insertion region 1 for the data carriers 5, 5'.

FIG. 9 shows the advantages of this configuration of the reading unit according to the invention in terms of access for people. The scanning beam 16 of the first proximity sensor 15, which is cast in the direction of access IN, detects that the person presenting a data carrier 5, 5' for reading to the insertion region 1 is correctly moving in the direction of access.

If this person would be on the exit side OUT, the scanning beam 16' of the second proximity sensor 15' behind the insertion region 1 would detect this and report it to an evaluation logic, not shown here. The release of the blocking means 4 could then be prevented.

The same applies when access for an entering person is blocked by another person. That situation too is detected.

This embodiment according to the invention makes it further possible to release the blocking means 4 in the respective direction by assigning the reading of a data carrier 5, 5' by the reading module, in particular a bar code scanner 11 or, in case of RFID data, an RFID reader, to the direction of movement of the user. This release is then performed by the evaluation logic not shown here, which queries the reading module and the two proximity sensor 15 and 15' and correspondingly generates release commands for the blocking means 4.

The invention claimed is:

1. A device for checking access authorizations stored on data carriers, comprising:
    a reading unit, arranged in an access region, for a data carrier one of held by an individual and worn by an individual, the reading unit actuating at least one of a signaling arrangement and a blocking arrangement directed at the individual, the reading unit including a housing with an insertion region for data carriers, the insertion region including an upper first wall with a reading module scanning the insertion region; and
    a lower second wall arranged in the insertion region and fastened pivotably to the housing, the reading unit adapted to be converted from a first state to a second state in a predefinable manner by pivoting the lower second wall, the reading unit further adapted to be converted from the second state to the first state in a second predefinable manner by further pivoting the lower second wall, the upper first wall and the lower second wall forming an acute angle in the first state.

2. The device according to claim 1, wherein the reading module has a window arranged in the upper first wall with a bar code scanner behind it, such that the bar code scanner scans the insertion region through the window.

3. The device according to claim 1, wherein the housing features a large-scale display above the upper first wall of the insertion region.

4. The device according to claim 1, wherein a proximity sensor is arranged in the housing of the reading unit, wherein a scanning range of the proximity sensor seen in the direction of access is oriented before or behind the insertion region for the data carriers.

5. The device according to claim 1, wherein two proximity sensors are arranged in the housing of the reading unit, wherein a scanning range of the first proximity sensor seen in the direction of access is oriented before the insertion region for the data carriers and wherein a scanning range of the second proximity sensor seen in the direction of access is oriented behind the insertion region for the data carriers.

6. The device according to claim 1, wherein the lower second wall is within the insertion region in the second state.

\* \* \* \* \*